United States Patent
Kim

(10) Patent No.: US 10,239,564 B2
(45) Date of Patent: Mar. 26, 2019

(54) FRONT VEHICLE BODY REINFORCING STRUCTURE

(71) Applicants: Hyundai Motor Company, Seoul (KR); Kia Motors Corporation, Seoul (KR)

(72) Inventor: Ildo Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/665,234

(22) Filed: Jul. 31, 2017

(65) Prior Publication Data
US 2018/0118271 A1     May 3, 2018

(30) Foreign Application Priority Data
Nov. 2, 2016    (KR) ................... 10-2016-0145302

(51) Int. Cl.
| | |
|---|---|
| *B62D 27/02* | (2006.01) |
| *B62D 25/20* | (2006.01) |
| *B62D 21/15* | (2006.01) |
| *F16F 7/12* | (2006.01) |

(52) U.S. Cl.
CPC ........... *B62D 27/02* (2013.01); *B62D 21/152* (2013.01); *B62D 21/157* (2013.01); *B62D 25/20* (2013.01); *F16F 7/12* (2013.01)

(58) Field of Classification Search
CPC .... B62D 21/152; B62D 25/025; B62D 25/08; B62D 25/20; B62D 25/2018; B62D 27/02
USPC ........ 296/203.01–203.03, 204, 209, 187.09, 296/187.1
See application file for complete search history.

(56) References Cited

U.S. PATENT DOCUMENTS

| | | | |
|---|---|---|---|
| 6,299,240 B1 * | 10/2001 | Schroeder | B62D 21/02 296/203.01 |
| 2013/0088045 A1 * | 4/2013 | Charbonneau | B62D 21/157 296/187.12 |
| 2017/0106914 A1 * | 4/2017 | Abe | B62D 21/157 |

FOREIGN PATENT DOCUMENTS

| | | |
|---|---|---|
| JP | 2551287 Y2 | 10/1997 |
| JP | 2015-093507 A | 5/2015 |

* cited by examiner

*Primary Examiner* — Dennis H Pedder
(74) *Attorney, Agent, or Firm* — Morgan, Lewis & Bockius LLP

(57) ABSTRACT

A front vehicle body reinforcing structure may include a front side member formed to extend along a longitudinal direction of a vehicle and respectively disposed on both sides along a width direction of the vehicle; a side sill member formed to extend along the longitudinal direction of the vehicle and disposed on both sides outside of the front side member along the width direction of the vehicle; and a reinforcing member formed to extend along the width direction of the vehicle and having one end portion and the other end portion, respectively coupled to the front side member and the side sill member to connect the front side member and the side sill member, increasing a structural strength to effectively respond to a front collision accident and a front small overlap collision accident.

11 Claims, 5 Drawing Sheets

FRONT VEHICLE BODY REINFORCING STRUCTURE

CROSS-REFERENCE(S) TO RELATED APPLICATIONS

The present application claims priority to Korean Patent Application No. 10-2016-0145302 filed on Nov. 2, 2016, the entire contents of which is incorporated herein for all purposes by this reference.

BACKGROUND OF THE INVENTION

Field of the Invention

The present invention relates to a front vehicle body reinforcing structure. More particularly, the present invention relates to a front vehicle body reinforcing structure configured for effectively responding to a front collision and a front small overlap collision by reinforcing a connection strength between a front side member configuring a front vehicle body of a vehicle, a torque box, and a side sill.

Description of Related Art

Generally, the front vehicle body of a vehicle is a structure of a frame that forms an engine compartment that is located in the front along the longitudinal direction of a vehicle. The front vehicle body includes a front end module that forms the front portion of the engine compartment and provided with a cooling module and a head lamp, etc., a front fender apron member that forms both of the left and right portions of the engine compartment and allocating the volume for wheels as well as a suspension system, and a dash panel that is disposed in the rear of the engine compartment and sections between the cabin and the engine compartment.

Also, a front end member extending in a longitudinal direction of a vehicle is disposed under the engine compartment in a left and right widthwise direction of a vehicle, thereby reinforcing the structural strength of the front vehicle body. A sub-frame configured to support an engine and a transmission, which are disposed in the engine compartment by mounting a suspension system, is disposed at the bottom of the front end member in a height direction of the vehicle, and is connected to the front end member.

A bumper beam, which is formed to extend in a width direction of the vehicle, is mounted on a front tip portion of the front side member to improve a performance for coping with a frontal collision of the vehicle.

In a case in which the vehicle, which is provided with the front vehicle body having the aforementioned structure, undergoes a frontal collision with an obstacle, or other vehicles, when the vehicle travels, the bumper beam first absorbs impact energy while being deformed by the received impact energy. The impact energy is also transferred to the front side member through the bumper beam wherein the front side member also absorbs impact energy while being deformed by receiving an impact, and the impact energy which is not absorbed by the front side member is distributed to and absorbed by other members in a vehicle body including the front fender apron member, the front pillar, and the like that are connected to the front side member.

On the other hand, a side sill formed to extend along with the longitudinal direction of the vehicle is disposed at a right and a left of the vehicle in the width direction to correspond to a side collision of the vehicle. For the side collision of a vehicle, a torque box is interposed between the side sill and the front side member, reinforcing the connection strength between the side sill, and the front side member.

However, in a conventional front vehicle body structure, as reinforcing members are added in a double or multiple type when joining the front side member and the torque box, a weight and a cost of the vehicle increase. Also, as the front side member and the front fender apron member are coupled through a side flange coupling, the coupling strength therebetween is weak. Hence, there is a disadvantage that it us insufficient for a front vehicle body to be effective when a front collision or front small overlap collision occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to provide a front vehicle body reinforcing structure for effectively responding to the front collision and the front small overlap collision by increasing a connection strength between the front side member, the torque box, and the side sill, more securely protecting passengers.

A front vehicle body reinforcing structure according to an exemplary embodiment of the present invention includes a front side member formed to extend along a longitudinal direction of a vehicle and respectively disposed on both sides along a width direction of the vehicle; a side sill member formed to extend along the longitudinal direction of the vehicle and disposed on both sides external to the front side member along the width direction of the vehicle; and a reinforcing member formed to extend along the width direction of the vehicle and having one end portion and the other end portion, respectively coupled to the front side member and the side sill member, coupling the front side member and the side sill member.

The front side member and the side sill member may be coupled to a floor panel.

The front side member may form a closed cross section.

The side sill member may form a closed cross section.

A torque box plate connecting the front side member and the side sill member may be further included.

One end portion of the torque box plate may overlap on the front side member to be integrally combined, and the other end portion may overlap on the side sill member to be integrally combined.

The torque box plate may be separated from the floor panel, and a closed cross section of a closed box shape may be formed between the torque box plate, the floor panel, the front side member, and the side sill member.

The reinforcing member may be formed of a pipe shape.

One end portion of the reinforcing member may penetrate the front side member to be joined, and the other end portion may be inserted internal to the closed cross section formed by the side sill 1 member to be joined.

The side sill member may include a side sill internal member positioned internally along the width direction of the vehicle and a side sill external member positioned externally; the side sill internal member and the side sill external member may be coupled to each other to form the closed cross section; and the other end portion of the reinforcing member may be inserted inside the closed cross section through the side sill internal member to be coupled to the side sill external member.

The side sill member may include a side sill internal member positioned internally along the width direction of the vehicle and a side sill external member positioned externally; one end portion of the reinforcing member may penetrate the front side member to be joined; and the other end portion of the reinforcing member may overlap a front tip end portion of the side sill internal member along the longitudinal direction of the vehicle.

The other end portion of the reinforcing member is pushed to form the joining flange coupled to the front tip end portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
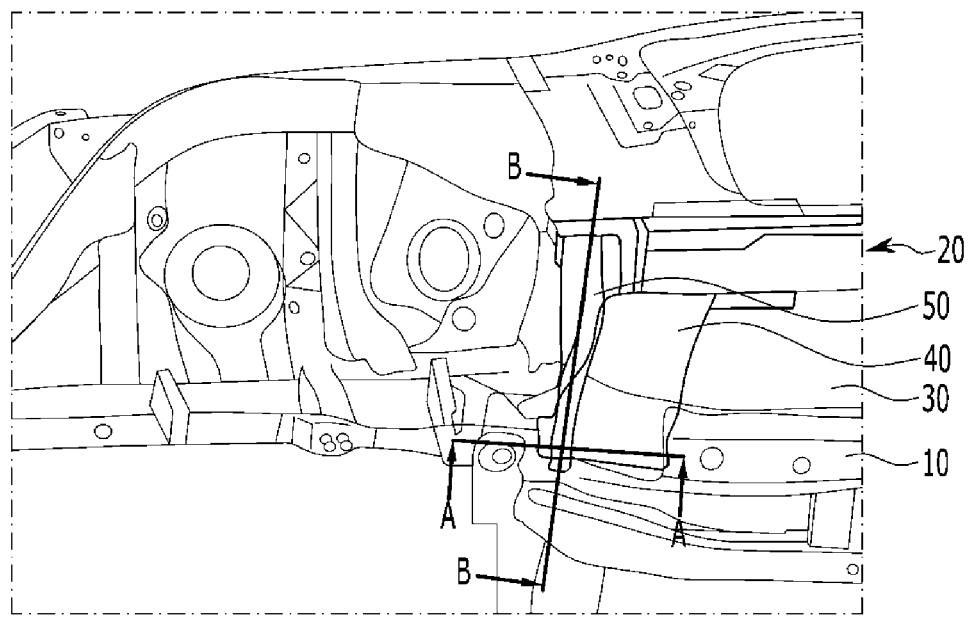
FIG. 1 is a perspective view of a bottom of a front vehicle body reinforcing structure according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
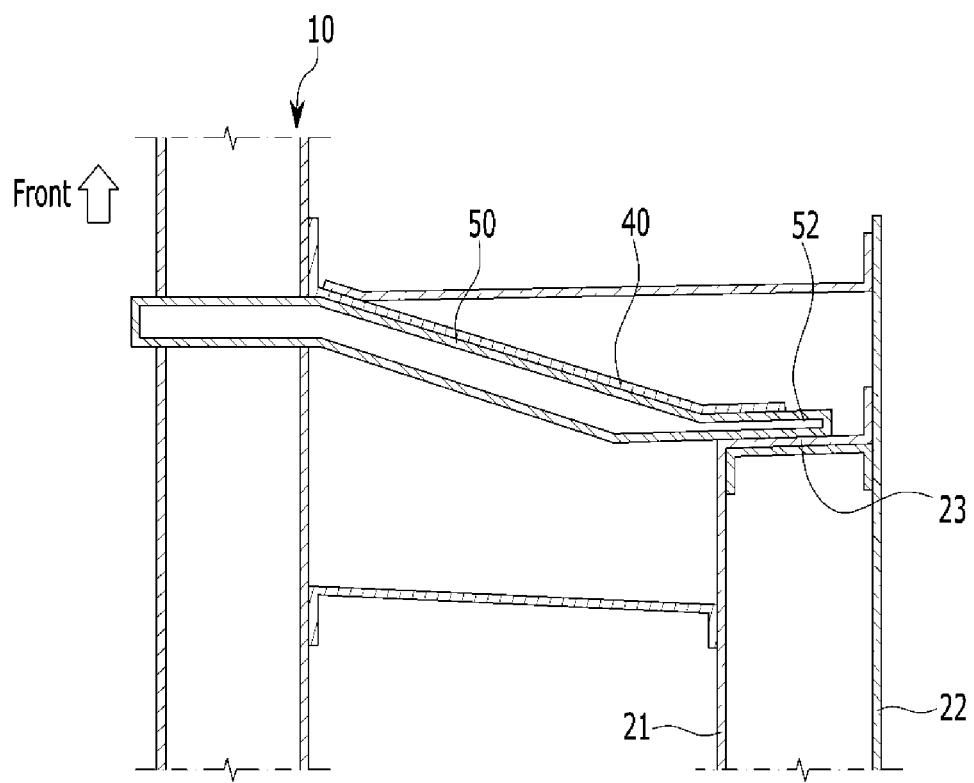
FIG. 2 is a cross-sectional view taken along a line A-A of FIG. 1.
Figure 3:
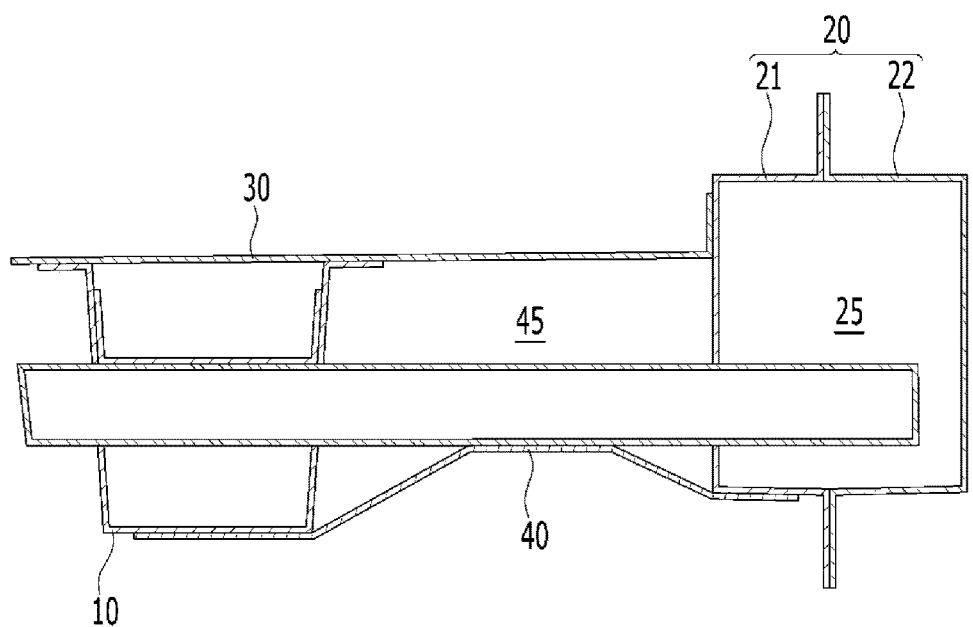
FIG. 3 is a cross-sectional view taken along a line B-B of FIG. 1.

Referring to FIG. 1 to FIG. 3, a front vehicle body reinforcing structure of a vehicle according to an exemplary embodiment of the present invention may include a front side member 10 formed to extend along a longitudinal direction of a vehicle and disposed on both sides along a width direction of the vehicle; and a side sill member 20 formed to extend along the longitudinal direction of the vehicle and disposed on both sides along the width direction of the vehicle external to the front side member 10.

The front side member 10 and the side sill member 20 may be respectively coupled to the floor panel 30 and be integrally combined.

Cross sections of the front side member 10 and the side sill member 20 may be respectively configured to form a closed cross section.

A torque box plate 40 may be provided to increase a connection strength between the front side member 10 and the side sill member 20 by connecting the front side member 10 and the side sill member 20.

One end portion of the torque box plate 40 may overlap the front side member 10 to be integrally combined, and the other end portion may overlap the side sill member 20 to be integrally combined.

The torque box plate 40 is separated from the floor panel 30, and accordingly a closed cross section 45 having a closed box shape may be formed between the torque box plate 40, the floor panel 30, the front side member 10, and the side sill member 20.

A reinforcing member 50 may be additionally provided to increase the connection strength between the front side member 10 and the side sill member 20 by connecting the front side member 10 and the side sill member 20.

The reinforcing member 50 is formed of an approximately pipe shape, however the present invention is not limited thereto.

One end portion of the reinforcing member 50 is coupled to the front side member 10 through the front side member 10, and the other end portion is inserted inside the closed cross section 25 including the side sill member 20 to be coupled to the side sill member 20.

That is, the side sill 1 member 20 may include a side sill internal member 21 positioned internally along the width direction of the vehicle and a side sill external member 22 positioned externally. The side sill 1 internal member 21 and the side sill external member 22 may be coupled to each other to form the closed cross section 25, and the other end portion of the reinforcing member 50 may be inserted inside the closed cross section 25 through the side sill internal member 21, and then may be coupled to the side sill external member 22.

Referring to FIG. 2, the other end portion of the reinforcing member 50 may overlap the front tip end portion 23 of the side sill internal member 21 along the longitudinal direction of the vehicle to be joined.

The other end portion of the reinforcing member 50 may be pushed to form a joining flange 52 for the combination between the other end portion of the reinforcing member 50 and the front tip end portion 23 of the side sill internal member 21.

The joining flange 52 may overlap the front tip end portion 23 of the side sill internal member 21 to be engaged by an appropriate device including a bolting, being joined.

Figure 4:
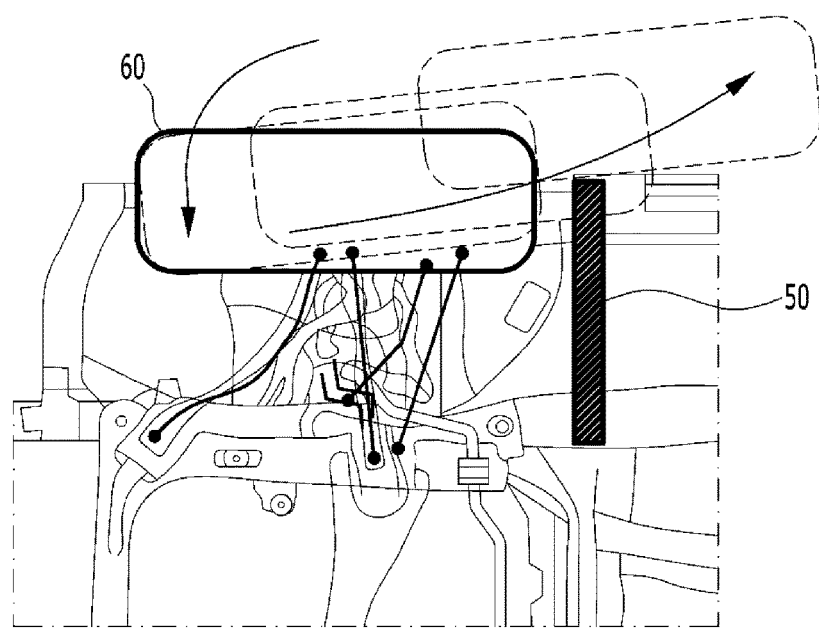
FIG. 4 is a schematic view illustrating a front vehicle body reinforcing structure according to an exemplary embodiment of the present invention inducing a tire departure when a collision accident of a vehicle occurs.
Figure 5:
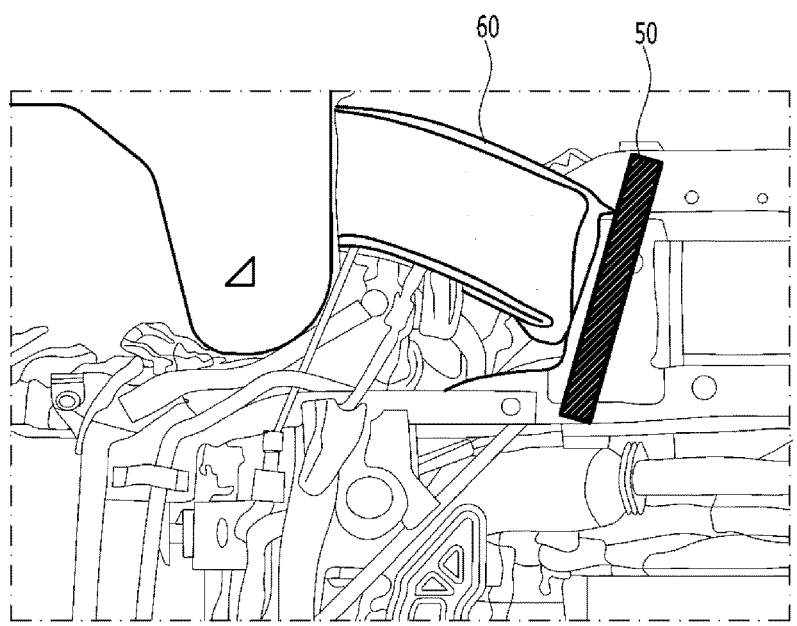
FIG. 5 is a schematic view illustrating a front vehicle body reinforcing structure according to an exemplary embodiment of the present invention preventing a tire from entering in a vehicle side when a small overlap collision of a vehicle occurs.

Referring to FIG. 4 and FIG. 5, for the vehicle applying the front vehicle body reinforcing structure according to an exemplary embodiment of the present invention, when the front collision or the front small overlap collision occurs, the tire 60 receives an impact load thereof and is pushed to a rear side along the longitudinal direction of the vehicle. In the present case, the reinforcing member 50 is positioned at the rear side rather than the tire 60 along the longitudinal direction of the vehicle wherein the departure of the tire 60 may be induced (referring to FIG. 4) and may prevent pushing into the vehicle compartment side of the tire 60 (referring to FIG. 5), accordingly it is possible to effectively reduce collision injuries of passengers onboard the passenger compartment.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body reinforcing structure comprising:
   a front side member formed to extend along a longitudinal direction of a vehicle and respectively disposed on a first side and a second side along a width direction of the vehicle;
   a side sill member formed to extend along the longitudinal direction of the vehicle and disposed on a first side and a second side external to the front side member along the width direction of the vehicle; and
   a reinforcing member formed to extend along the width direction of the vehicle and having a first end portion and a second end portion thereof, respectively coupled to the front side member and the side sill member to connect the front side member and the side sill member,
   wherein a first end portion of the reinforcing member penetrates the front side member to be joined, and a second end portion thereof is inserted internal to the closed cross section formed by the side sill member to be joined.

2. The front vehicle body reinforcing structure of claim 1, wherein the front side member and the side sill member are coupled to a floor panel.

3. The front vehicle body reinforcing structure of claim 1, wherein
   the front side member forms a closed cross section.

4. The front vehicle body reinforcing structure of claim 1, wherein
   the side sill member forms a closed cross section.

5. The front vehicle body reinforcing structure of claim 1, further including:
   a torque box plate connecting the front side member and the side sill member.

6. The front vehicle body reinforcing structure of claim 5, wherein
   a first end portion of the torque box plate overlaps on the front side member to be integrally combined, and a second end portion overlaps on the side sill member to be integrally combined.

7. The front vehicle body reinforcing structure of claim 5, wherein
   the torque box plate is separated from the floor panel, and a closed cross section having a closed box shape is formed between the torque box plate, the floor panel, the front side member, and the side sill member.

8. The front vehicle body reinforcing structure of claim 1, wherein
   the reinforcing member is formed having a pipe shape.

9. The front vehicle body reinforcing structure of claim 1, wherein
   the side sill member includes a side sill internal member disposed internally along the width direction of the vehicle and a side sill external member disposed externally;
   the side sill internal member and the side sill external member are coupled to each other to form the closed cross section; and
   the second end portion of the reinforcing member is inserted inside the closed cross section through the side sill internal member to be coupled to the side sill external member.

10. The front vehicle body reinforcing structure of claim 1, wherein
    the side sill member includes a side sill internal member disposed internally along the width direction of the vehicle and a side sill external member disposed externally;
    a first end portion of the reinforcing member penetrates the front side member to be joined; and
    a second end portion of the reinforcing member overlaps a front tip end portion of the side sill internal member along the longitudinal direction of the vehicle.

11. The front vehicle body reinforcing structure of claim 10, wherein a second end portion of the reinforcing member includes a joining flange coupled to the front tip end portion.

* * * * *